(12) United States Patent
Lenzini et al.

(10) Patent No.: US 8,355,368 B2
(45) Date of Patent: Jan. 15, 2013

(54) METHOD AND SYSTEM FOR AUTOMATIC SELECTION OF DETOUR PATHS IN A WIRELESS MESH NETWORK

(75) Inventors: Luciano Lenzini, Leghorn (IT); Enzo Mingozzi, Pisa (IT); Luca Bisti, Pisa (IT); Torquato Bertani, Milan (IT); Alessandro Erta, Barbarasco Tresana (IT); Umberto Malesci, Milan (IT)

(73) Assignee: Fluidmesh Networks S.R.L., Milan (IT)

( * ) Notice: Subject to any disclaimer, the term of this patent is extended or adjusted under 35 U.S.C. 154(b) by 0 days.

(21) Appl. No.: 13/442,543

(22) Filed: Apr. 9, 2012

(65) Prior Publication Data

US 2012/0257572 A1 Oct. 11, 2012

(30) Foreign Application Priority Data

Apr. 11, 2011 (EP) .................................... 11003012

(51) Int. Cl.
*H04W 40/00* (2009.01)
*H04J 1/16* (2006.01)

(52) U.S. Cl. ........................................ 370/328; 370/406

(58) Field of Classification Search .................. 370/328, 370/217, 221, 445, 406, 218, 230, 235, 238, 370/254, 338, 394, 401

See application file for complete search history.

(56) References Cited

U.S. PATENT DOCUMENTS

| 7,839,856 | B2 * | 11/2010 | Sinha et al. | 370/392 |
| 8,208,371 | B2 * | 6/2012 | Li et al. | 370/217 |
| 2003/0028818 | A1 | 2/2003 | Fujita | |
| 2005/0099948 | A1 * | 5/2005 | Wakumoto et al. | 370/236 |
| 2005/0259587 | A1 * | 11/2005 | Wakumoto et al. | 370/248 |
| 2009/0228575 | A1 | 9/2009 | Thubert et al. | |

FOREIGN PATENT DOCUMENTS

| EP | 1404070 A2 | 3/2004 |
| EP | 1826961 A1 | 8/2007 |
| EP | 2512076 A1 * | 10/2012 |

OTHER PUBLICATIONS

Thomas H. Cormen, et al., Introduction to Algorithms, 2009, Third Ed., pp. 658-664, MIT Press, United States.
E. W. Dijkstra, A Note on Two Problems in Connexion with Graphs, 1959, Numerisch Mathematik 1, pp. 269-271, Springer, Germany.
Luciano Lenzini, et al., End-to-End Quality of Service over Heterogenous Networks, 2008, pp. 56-62, Springer-Vertag, Berlin, Germany.
European Patent Office, Search Report issued in priority EP Application No. 11003012.9, Dated Sep. 19, 2011.

\* cited by examiner

*Primary Examiner* — Ian N Moore
*Assistant Examiner* — Thai Nguyen
(74) *Attorney, Agent, or Firm* — Patzik, Frank & Samotny Ltd.

(57) ABSTRACT

Method of detour path determination for data packets re-routing in a mesh network comprising a plurality of N nodes, arranged according to a network topology, each node has a K-hops neighborhood knowledge of the network topology, with 1≦K<N, primary paths are predefined for routing data packets within the mesh network. Detour paths are automatically discovered and set up while expending relatively few resources in terms of processing complexity, signaling and information spreading. The method is particularly advantageous when used in a wireless mesh network wherein the available bandwidth and the node resources and capabilities are much more limited than in wired networks.

15 Claims, 8 Drawing Sheets

METHOD AND SYSTEM FOR AUTOMATIC SELECTION OF DETOUR PATHS IN A WIRELESS MESH NETWORK

CROSS-REFERENCE TO RELATED APPLICATIONS

This application claims the benefit of European patent application No. 11003012.9, filed Apr. 11, 2011, the entirety of which is hereby incorporated by reference.

BACKGROUND OF THE INVENTION

1. Field of the Invention

The present invention relates to a method and system for automatic selection of detour paths in a wireless mesh network.

2. Description of Related Art

Wireless Mesh Networks (WMNs) are two-tier networks where nomadic or mobile users access the Internet or intra-WMN services via a wireless backbone made of a number of Mesh Routers (MRs) communicating with each other over wireless links. The users can be laptops, cell phones, personal digital assistants, data collection devices and sensors (for example in the field of video-surveillance), and so on. MRs forward packets in a multi-hop manner to reach the intended destination within the WMN. Usually, MRs are in fixed positions, but some degree of mobility is also possible. Wireless mesh networks can be implemented with various technologies including 802.15, 802.11, 802.16 IEEE standards.

Even though nodes are usually in fixed positions, WMN resiliency is significantly affected by time-varying phenomena, like interference from co-located networks, shadowing, and obstruction, which are connected to the wireless channel characteristics. These phenomena may lead to transient wireless link failures that may occur at very short time scales.

Re-Routing techniques, that is techniques adapted to detour data packets into detour paths whenever a problem is detected on a primary path, are known in the art.

Re-Routing techniques can be of the reactive or proactive type. In the first case, detour paths are set-up a posteriori, whenever a failure is detected. In the second case, instead, detour paths are set-up a priori, before failure detection, in order to guarantee smaller response time.

For example, Fast Re-Routing (FRR) proactive techniques have been developed in the art to improve the resilience of wired (IP-based) networks. Multi Protocol Label Switching (MPLS) Fast Re-Route is standardized by the Internet Engineering Task Force (IETF) and is a feature of the RSVP Traffic Engineering (RSVP-TE) protocol. MPLS Fast Re-Route leverages on the availability of a Traffic Engineering Database (TED) containing detailed and up-to-date information of the network topology and resources reserved on each link. This information is usually collected by means of Open Shortest Path First routing protocol with Traffic Engineering extensions.

BRIEF SUMMARY OF THE INVENTION

The Applicant faced the technical problem of providing Re-Routing in a WMN.

The Applicant observed that the above mentioned MPLS Fast Re-Route technique relies on a full knowledge of the network topology.

However, maintenance of a full and continuously up-to-date network topology knowledge requires numerous and frequent exchanges of information between the nodes of the network and a high number of information to be processed by each node.

Said maintenance can be a very hard task to be achieved in a WMN.

Indeed, in a WMN the available bandwidth and the node resources and capabilities are much more limited than in wired networks. Moreover, the case where different nodes have inconsistency in their topology knowledge might be very likely to occur, due to the time-varying characteristics of the wireless links.

The Applicant thus faced the technical problem of implementing proactive re-routing in a WMN by means of an effective procedure which requires very little resources in terms of processing complexity, signaling and information spreading.

The Applicant found that this can be achieved through a method of detour path determination, wherein, for data packets re-routing in a mesh network comprising a plurality of N nodes, with N being an integer greater than 1, arranged according to a network topology, each node having a K-hops neighborhood knowledge of the network topology, with $1 \leq K < N$, primary paths being predefined for routing data packets within the mesh network, each primary path comprising a predefined ordered sequence of nodes, wherein, in order to obtain at least one detour path for at least part of a primary path PPx comprising a ordered sequence of nodes with a head node I and an end node J:

a) the head node I generates and sends to the node following it in the ordered sequence of nodes a request data packet, the request data packet comprising information enabling the request data packet to travel through said ordered sequence of nodes according to a forward direction till the end node J;

b) at the receipt of the request data packet, the end node J generates and sends to the node preceding it in the ordered sequence of nodes a response data packet, the response data packet comprising information representative of the K-hops neighborhood knowledge of the network topology of node J, and information enabling the response data packet to travel back through said ordered sequence of nodes till the head node I according to a backward direction;

c) at the receipt of the response data packet, the head node I processes the information representative of the K-hops neighborhood knowledge of node J so as to obtain a merged knowledge of the network topology comprising the K-hops neighborhood knowledge of node I and the K-hops neighborhood knowledge of node J; then head node I uses the merged knowledge of the network topology to carry out a detour path computation to find if there is said at least one detour path for said at least part of the primary path PPx.

The present invention also relates to a mesh network, comprising a plurality of N nodes, with N being an integer greater than 1, arranged according to a network topology, wherein each node has a K-hops neighborhood knowledge of the network topology, with $1 \leq K < N$, primary paths are predefined for routing data packets within the mesh network, and each primary path comprises a predefined ordered sequence of nodes, with said N nodes comprising modules adapted to carry out the steps of the method described above.

Further characteristics and advantages of the present invention will become clearer from the following detailed description of some preferred embodiments thereof, made as an example and not for limiting purposes with reference to the attached drawings.

DETAILED DESCRIPTION OF THE INVENTION

Figure 1:
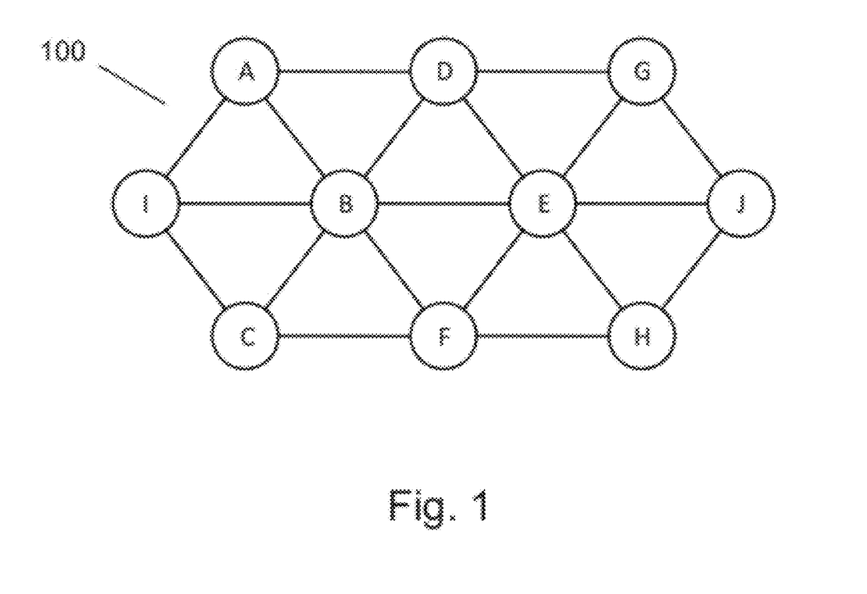
FIG. 1 of the drawings shows a scheme of an exemplary wireless mesh network.

FIG. 1 shows a scheme of an exemplary wireless mesh network (WMN) 100 comprising a plurality of N nodes A, B ..., J, with N=10.

The nodes may be mesh routers (MRs).

Any two nodes that can communicate directly with one another are said to share a link and are called 1-hop neighbors. Nodes having a common neighbor but that are not neighbors themselves are called two-hop neighbors. Generalizing, nodes are said to be k-hop neighbors if there exists a k-hop path between them, i.e., with k−1 nodes in between, and no path shorter than a k-hop one exists between them.

Given a node I, the set of its k-hop neighbors is hereinafter denoted by $N_k(I)$.

In the exemplary WMN 100 of FIG. 1: $N_0(I)=\{I\}$; $N_1(I) =\{A, B, C\}$; $N_2(I)=\{D, E, F\}$; $N_3(I)=\{G,H,J\}$.

According to the invention, each node of the WMN 100 has a K-hop neighborhood knowledge, wherein k is an integer, with $1 \leq K < N$. K can be a system parameter. Advantageously, K is much smaller than N. For example, k=1 or 2 and $10 \leq N \leq 20$.

The K-hop neighborhood knowledge of each node X, hereinafter denoted by $T_k(X)$, can be either full or partial.

The full K-hop neighborhood knowledge means that each node knows the 1-hop neighbors $N_1(X)$, for each node X belonging to $N_i(I)$, for $0 \leq i \leq K-1$.

Figure 2:
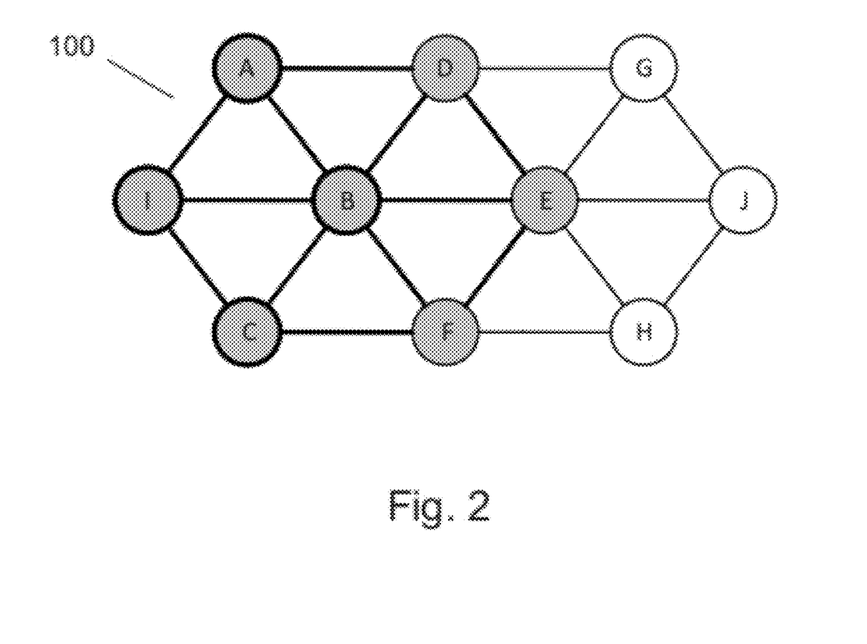
FIG. 2 schematically shows an example of full K-hop neighborhood knowledge, with K=2, for node I of the wireless mesh network of FIG. 1.

An example of node I full K-hop neighborhood knowledge, with K=2, is reported in FIG. 2, wherein the links and neighbor nodes known by node I are shown in bold and grey color, respectively.

Information about the full K-hop neighborhood knowledge is typically available in a WMN from an underlying Medium Access Control (MAC) protocol, at least for $K \leq 2$. Indeed, this knowledge is typically needed at the MAC level to coordinate access to the channel in order to avoid or minimize transmission collisions. Examples of technologies for WMNs that embed signaling in the MAC control plane to exchange 2-hop neighborhood information are IEEE 802.11s, IEEE 802.15.5, and IEEE 802.16 mesh mode.

Figure 3:
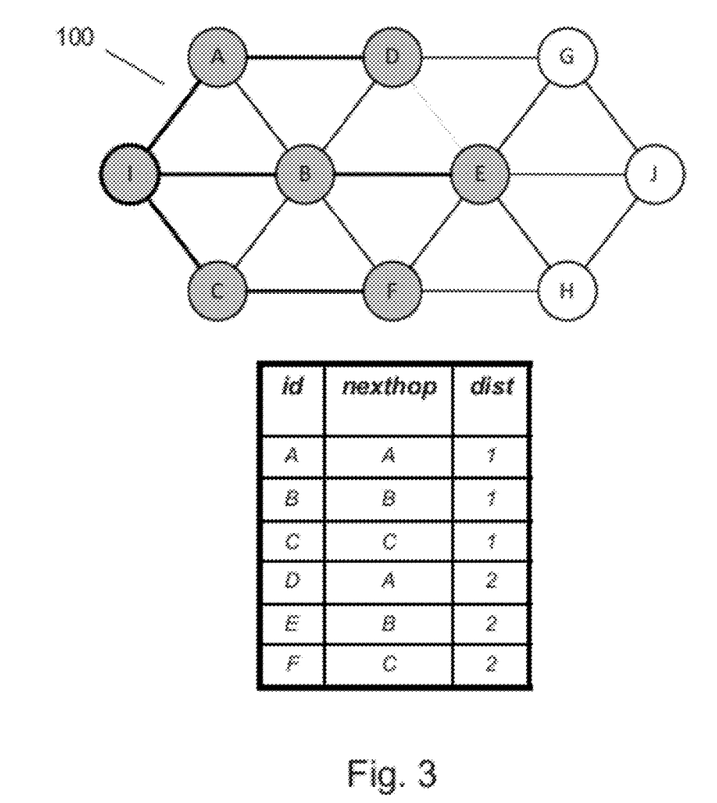
FIG. 3 schematically shows an example of partial K-hop neighborhood knowledge, with K=2, for node I of the wireless mesh network of FIG. 1.

The partial K-hop neighborhood knowledge means that each node only has a partial knowledge of the WMN topology within its K-hop neighborhood. In particular, each node I only knows $N_i(I)$, for $0 \leq i \leq K$. Moreover, for each node X belonging to $N_i(I)$, for $0 < i \leq K$, it is assumed that node I knows only the first hop of one i-hop path to reach node X. An example of node I partial K-hop neighborhood knowledge, with K=2, is reported in FIG. 3. In particular, the table in FIG. 3 shows the raw knowledge at node I disposal while the links and neighbor nodes in bold and grey color, respectively, show the information that node I can deduce from such table.

In the WMN 10 primary paths are predefined and set up for routing data packets among the nodes.

The primary paths are selected and set up by the WMN control plane. As known in the art, the control plane is the part of the network architecture that is concerned with determining the information needed to define what to do with received packets. The primary path selection mechanism can be performed by executing a conventional WMN distributed routing protocol, or centrally solving some traffic engineering optimization problem.

Forwarding of data packets in the WMN 10 is advantageously performed in the data plane by means of label switching. As known in the art, the data plane is the part of the network architecture concerned with looking up received packets and decide how to handle them based on the information provided by the control plane.

Label switching means a mechanism wherein data packets are forwarded on the basis of their label.

A practical implementation of label switching could be based on MultiProtocol Label Switching (MPLS), which is an Internet Engineering Task Force (IETF) standardized protocol.

According to MPLS, data packets entering the WMN at one node, called ingress, are classified into a Forwarding Equivalence Class (FEC). All data packets with the same FEC follow a same primary path (called Label Switched Path or LSP) to the destination node, called egress. In the simple case, there exists exactly one FEC per each node in the WMN, i.e., classification is by destination address. However, the proposed procedure can also be used without modifications in the more general case of arbitrary FECs, e.g., as resulting from a traffic engineering method. All the nodes of the WMN, including intermediate ones, take per-packet forwarding decisions based on their label Forwarding Information Base (LFIB) structures. Said LFIB structures can be seen as associative tables, where the key is the label of an incoming packet (IN). Other fields in the LFIB structures can be the performed action (ACT), the output label (OUT), and the next 1-hop node for packet forwarding (NXT).

Figure 4:
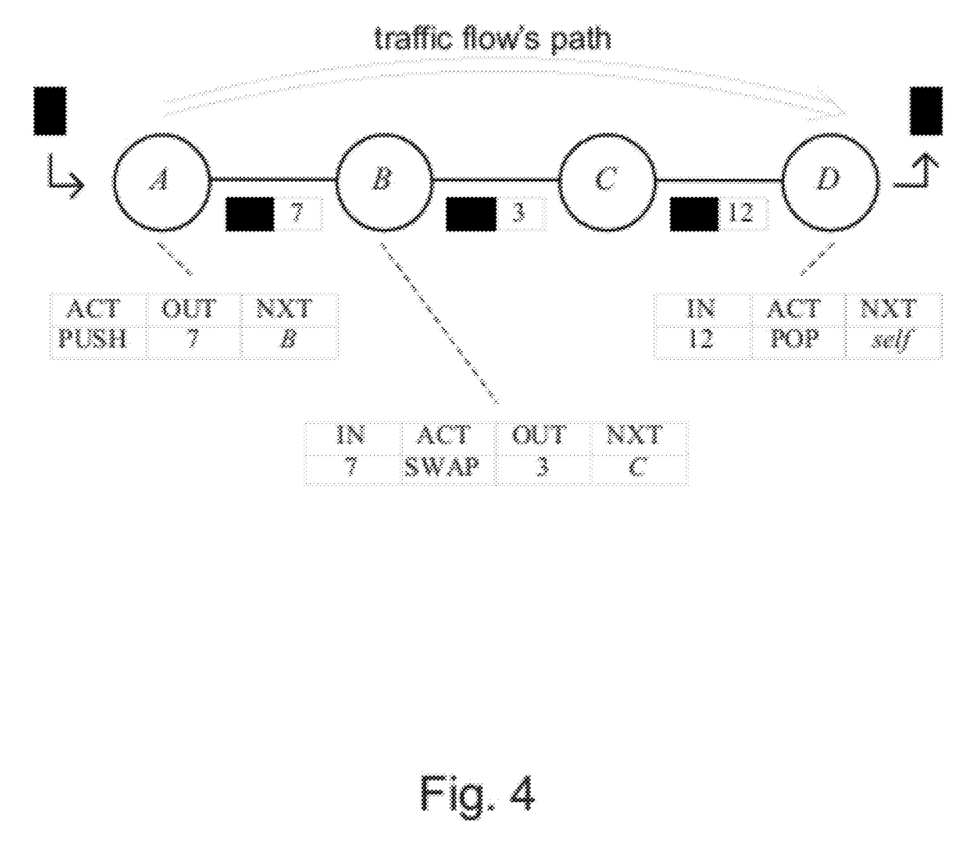
FIG. 4 schematically shows an exemplary use of a LFIB structure according to MPLS.

A simple example to show the use of the LFIB structure is illustrated in FIG. 4, wherein it is assumed that there is an LSP established between node A and node D. The ingress node, i.e., A, classifies the data packets of the traffic flow according to their destination, i.e., D. The entry "PUSH", "7", "B" respectively in the fields ACT, OUT, NXT of A's LFIB is used to assign label 7 to all the packets belonging to the predefined FEC and to specify that the next 1-hop node to which the packets have to be sent is B. This latter information will be used by the MAC layer to fill the destination MAC address field. In B's LFIB, entry "7", "SWAP", "3", "C" respectively in fields IN, ACT, OUT, NXT is used to change the label into 3 to all packets received by node B with label 7 and to indicate that the next 1-hop node is C. A similar action is performed by C, whose LFIB is not shown in the figure. Finally, when the egress node, i.e., D, receives the packet, it removes the label, as indicated by the POP action and passes the packet to the upper layers, thus leaving the WMN domain.

Advantageously, in the data plane of WMN 10 label stacking is also implemented. This means that a single packet can carry two (and, in general, even more) labels: an inner label, which refers to a primary path, and an outer label, which is used over a secondary path (and so forth in the case of additional labels).

Label stacking is an efficient technique to enable fast re-routing of packets into a backup (detour) path deviating from an original primary path.

As mentioned above, Fast Re-Route via label stacking is standardized by IETF in MPLS with Traffic Engineering (TE) extensions. With MPLS Fast Re-Route primary and backup LSPs are established for next-hop or next-next-hop MPLS FRR (the former can protect against link failures while the latter can protect against link or router failures). When a failure is detected at the upstream router from the failure, the MPLS forwarding label for the backup LSP is pushed on the MPLS shim header at the upstream router and popped at the downstream router (next-hop or next-next-hop). These labels are pre-calculated and stored in the forwarding tables, so restoration is very fast.

Figure 5:
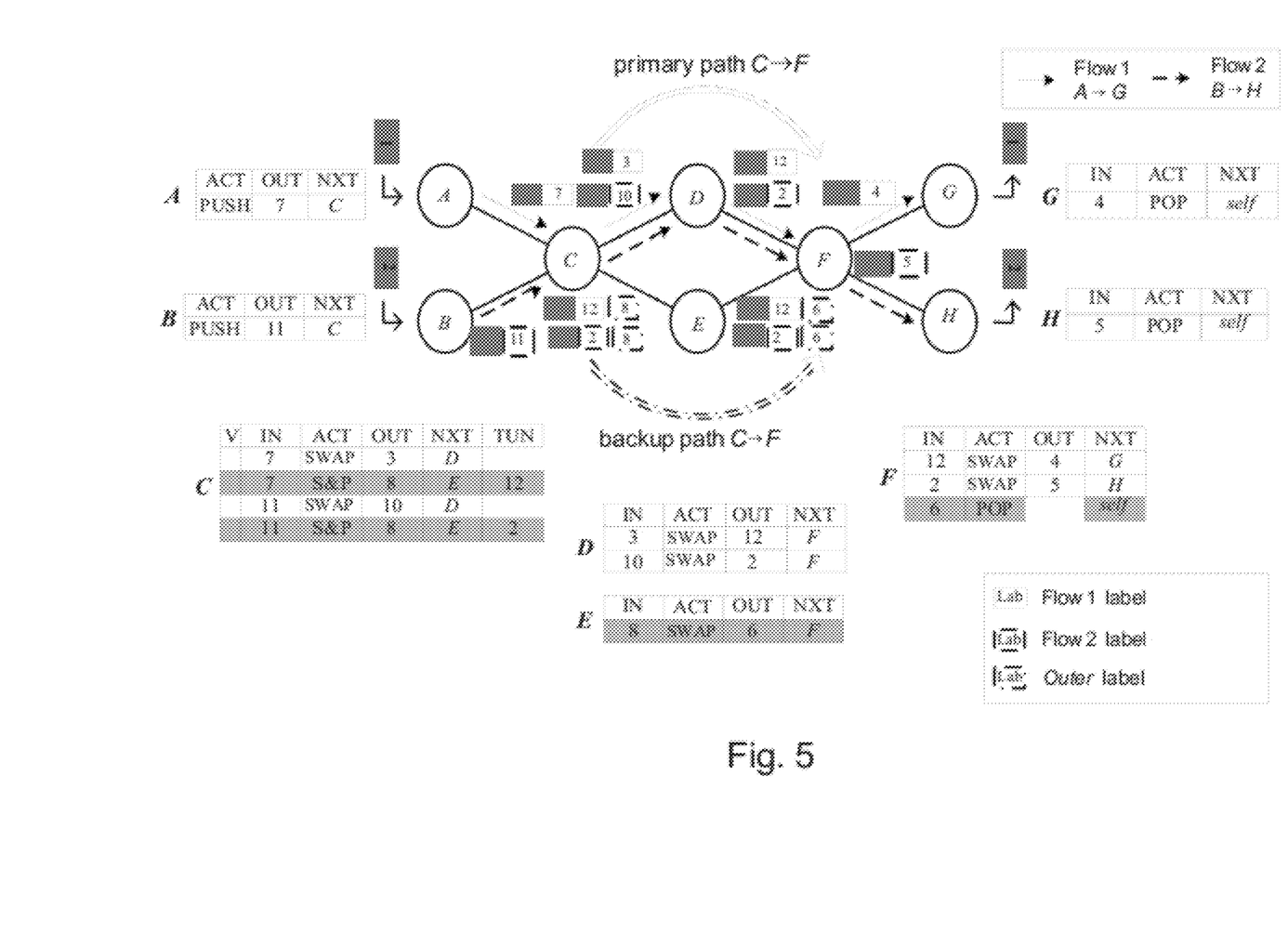
FIG. 5 schematically shows an exemplary use of label stacking in order to enable fast re-routing over a detour path.

A simple example to show the use of label stacking in WMN 10 in order to enable fast rerouting over a detour path is illustrated in FIG. 5. In the example there is a first primary path from A to G comprising the ordered sequence of nodes A, C, D, F, G and second primary path from B to H comprising the ordered sequence of nodes B, C, D, F, H. In addition, a detour path C, E, F has been set up.

In order to set up detour path C, E, F, the following additional entries are required (shown in gray in FIG. 5) in the LFIB structures of nodes C, E, F, when the first primary path from A to G is taken into consideration:

On node C the LFIB structure has an additional entry (shown in gray color) with action SWAP&PUSH (S&P), that specifies that incoming packets with label 7 are to be forwarded to node E with inner label 12 (specified in TUN field) and outer label 8 (specified in OUT field). This additional entry is enabled only when the main SWAP entry is temporarily disabled (e.g., due to a failure detection in link C-D or in node D). The inner label (12 in the example) is the same that would be used by node D to forward packets to node F.

On node E the LFIB structures comprises the following entry: "8", "SWAP", "6", "F" in fields IN, ACT, OUT, NXT, respectively, which is used to change the label 8 into 6 to all packets received by node E with label 8 and to indicate that the next 1-hop node is F.

Finally, on node F the LFIB structure comprises the following entry: "6", "POP", "self" respectively in fields IN, ACT, NXT, which is used to remove the outer label from all packets received with label 6 and to cause a recursive access to the LFIB by using the inner label (in the example 12) as access key.

The additional entries required (shown in gray in FIG. 5) in the LFIB structures of nodes C, E, F, when the second primary path from B to H is taken into account, are shown in FIG. 5.

As stated above, as MPLS Fast Re-Route is a feature of the RSVP Traffic Engineering (RSVP-TE) protocol, it leverages on the availability of a Traffic Engineering Database (TED) containing full and up-to-date information of the network topology and resources reserved on each link.

However, in the WMN 10 according to the invention, no TED-based information is available for identifying and setting up detour paths to which re-route data packets whenever a problem is detected on a primary path. As said above, only the k-hop neighborhood topological knowledge is at disposal of each node of the WMN 10.

The nodes of the WMN 10 comprise hardware, software and/or firmware modules adapted to implement the method of the invention, according to which detour paths can be identified and set up a priori only by making use of said limited K-hop neighborhood knowledge of the network topology.

Figure 6:
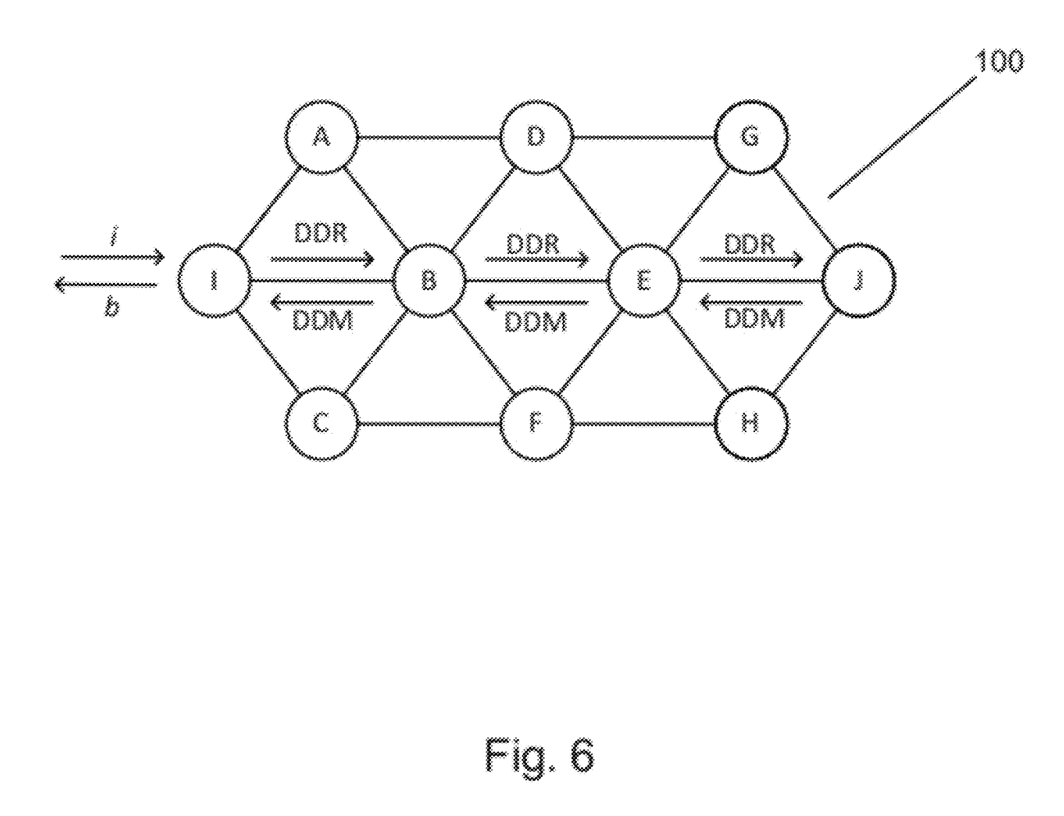
FIG. 6 schematically shows the propagation of a request data packet DDR along a forward direction i and the propagation of a response data packet DDM in the backward direction b through the nodes of a primary path I,B,E,J, according to an embodiment of the method of the invention.

According to the method of the invention, in order to identify and set up a detour path for a primary path PPx (or part thereof), wherein the primary path PPx (or part thereof) has length L (in hops) and comprises a ordered sequence of nodes (e.g., I,B,E,J in the example shown in FIG. 6), the following steps are carried out:

a) head node I generates and sends to the next 1-hope node (e.g., node B in FIG. 6) in the ordered sequence of nodes a request data packet DDR, the request data packet DDR comprising information enabling the request data packet DDR to travel through said ordered sequence of nodes according to a forward direction (indicated with arrow "i" in FIG. 6) till the end node J;

b) at the receipt of the request data packet DDR, the end node J generates and sends to the previous 1-hop node (e.g., node E in FIG. 6) in the ordered sequence of nodes a response data packet DDM, the response data packet DDM comprising: information enabling the response data packet DDM to travel back through said ordered sequence of nodes till the head node I, according to a backward direction (indicated with arrow "b" in FIG. 6), and information representative of the K-hops neighbourhood knowledge $T_k(J)$ of the network topology at disposal of node J;

c) at the receipt of the response data packet DDM, the head node I processes the information representative of node J K-hops neighbourhood knowledge so as to obtain a merged knowledge of the network topology comprising the K-hops neighbourhood knowledge of node I and the K-hops neighbourhood knowledge of node J. Then head node I uses the merged knowledge of the network topology to carry out a detour path computation to check if there is at least one detour path for the primary path PPx.

The length L (in hops) of the primary path PPX (or part thereof) is equal or greater than 1. When the K-hop neighborhood knowledge of the nodes is full, the length L (in hops) is preferably equal or greater than K.

The identified detour path will have a length L' (in hops) $\leq 2*k$.

The request data packet DDR is elaborated in sequence by each intermediate node between head node I and end node J (e.g., nodes B, E in FIG. 6) and passed downstream until the request data packet DDR finally reaches end node J. The latter replies with the response data packet DDM which then travels back by passing through each node between J and I (e.g., nodes E, B in FIG. 6), until the response data packet DDM finally reaches head node I.

In a preferred embodiment of the invention, the request data packet DDR generated by head node I includes the following information:

- Hop Counter (HC), which represents the number of hops until the destination node (e.g., J in the example of FIG. 6). As in WMN 10 packets are forwarded on the basis of their label and not on the basis of their destination address, this parameter enables the request data packet DDR to propagate through the ordered sequence of nodes of the primary path PPx till the destination node J is reached (at HC=0).
- Output Label (OL), which is the output label (that is, the label in the LFIB's OUT field) used by head node I along the primary path PPx. This label is needed to enable the next 1-hop node to identify the primary path PPx.
- Ordered list of traversed node identifiers, which enables the response data packet DDM to travel back to node I along the same path as the request data packet DDR, in the backward direction b. This is needed because in MPLS the paths (LSPs) are unidirectional (i.e., the upstream node is not available in the LFIB structure of a downstream node).

In the above step a, head node I thus preferably carries out the following steps:

1. sets hop counter HC to the length L of the primary path PPx to be protected by the detour path (i.e., number of hops between I and J) thus implicitly identifying the latter, since the primary path PPx is fixed;
2. sets the output label OL to the output label that in its LFIB is related to the primary path PPx for which it wants to discover a detour path;
3. initializes the list of traversed node identifiers with its own node identifier;

When the request data packet DDR is received by an intermediate node (e.g., B or E), the latter carries out the following steps:

1. it decrements the hop counter HC. As the remainder will be greater than zero, it recognizes to be an intermediate node;
2. it looks up its LFIB with the label specified in OL, thus identifying in the NXT field the next 1-hop node along the primary path PPx, and in the OUT field the new value to assign to OL;
3. it adds its own node identifier at the top of the ordered list of traversed node identifiers; and
4. it forwards the request data packet DDR so modified to the next node.

In the above mentioned step b, at the receipt of the request data packet DDR, the end node J preferably performs the following actions:

1. it decrements the hop counter HC. As the remainder will be zero, it recognizes to be the destination node; and
2. it generates the response data packet DDM. Besides the information representative of the K-hops neighbourhood knowledge $T_k(J)$ of the network topology at disposal of node J, the response data packet DDM advantageously includes also the ordered list of traversed node identifiers, as copied from the received request data packet DDR. As in MPLS the paths (LSPs) are unidirectional, this information is needed to enable the response data packet DDM to travel back to node I exactly along the same path PPx as the received request data packet DDR; and
3. sends the response data packet DDM back, along the primary path PPx, to the previous 1-hop node (e.g., E in FIG. 6). This latter node is identified by looking up in the ordered list of traversed node identifiers by starting from the top of the list.

When the response data packet DDM is received by an intermediate node (e.g., E or B), the latter passes the response data packet DDM back unchanged to the previous 1-hop node, identifying it by looking up in the ordered list of traversed node identifiers by starting from the top of the list and taking out the one immediately following its own identifier.

Similarly, the ordered list of traversed node identifiers enables node I to identify itself as the destination of the response data packet DDM.

In another embodiment of the invention, a node in the WMN 10 which is included in at least one primary path PPx may be adapted to store information concerning the sequence of nodes crossed by said primary path PPx. Such information might include a) the output label (that is, the label in the OUT field of the node's LFIB table) used by the node along the primary path PPx; and b) the list of node identifiers of the next P hops ($L \leq P \leq N$) in the primary path PPx starting from the considered node. Such information could for example be provided to the local node by means of suitable modifications of the LSP setup protocol adopted in the network architecture. Under this assumption, in order to identify and setup a detour path for a primary path PPx (or part thereof) of length L (e.g., I,B,E,J in the example shown in FIG. 6), a head node I might perform the following steps:

1. it looks up the information locally stored by using the output label identifying the primary path PPx as access key and it retrieves said the ordered list of node identifiers, possibly truncated at the end so that the retrieved list comprises the first L+1 nodes(e.g., in the example of FIG. 6 nodes I,B,E,J);
2. it generates a request data packet DDR' including the retrieved ordered list of node identifiers;
3. it forwards the request data packet DDR' to the next 1-hop node in the list (e.g., in the example of FIG. 6, to node B).

When the request data packet DDR' is received by a next node (e.g., B, E or J), the latter carries out the following steps:

1. it locates itself by looking up the ordered list of node identifiers contained into the DDR' packet.
2. if the node identifies itself as an intermediate node in the path, i.e. its identifier appears in the list before the end node, it simply forwards the message to the next node included in the list after its own identifier.
3. if the node identifies itself as the end node in the list, it generates the DDM packet, inserts the list as received in the DDR' packet after reversing its order and removing its own identifier from the top of the resulting list, then handles the DDM packet as described above with reference to the preferred embodiment of the invention.

As mentioned above, the K-hop neighborhood knowledge of node I and node J can be either full or partial.

When the K-hop neighborhood knowledge of node I and node J is full, the above mentioned step c) is advantageously carried out according to the following procedure.

When node I receives the response data packet DDM, it gets to know from the received DDM packet both the K-hops neighbourhood knowledge $T_k(J)$ of node J and the list of nodes along the primary path PPx between I and J, including I and J themselves. In addition, by assumption, node I has a K-hops neighbourhood knowledge $T_k(I)$ of the network topology. The detour path, if any, is then advantageously obtained by computing a constrained path from I to J in the network graph resulting from the union of $T_k(I)$ and $T_k(J)$, after pruning from the graph all intermediate nodes belonging to the primary path PPx.

Figure 7:
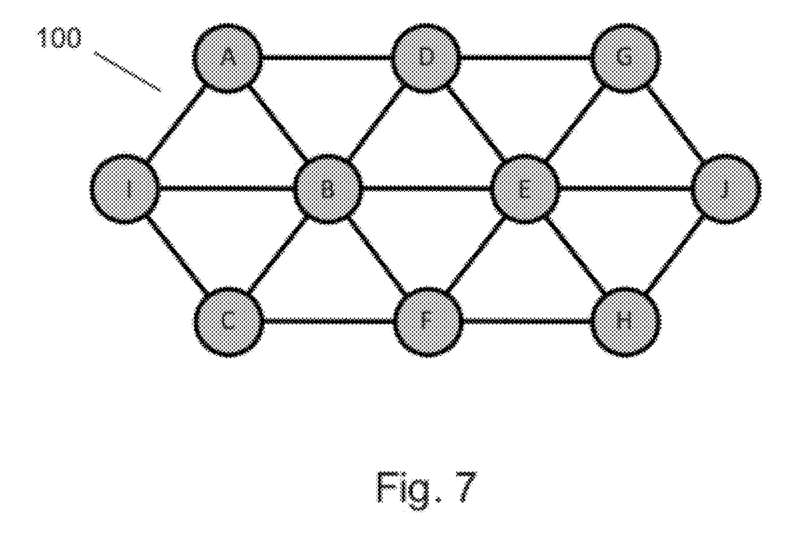
FIG. 7 schematically shows a full network topology knowledge around I and J, as can be obtained by head node I after the propagation of the request data packet DDR and response data packet DDM as shown in FIG. 6.
Figure 8:
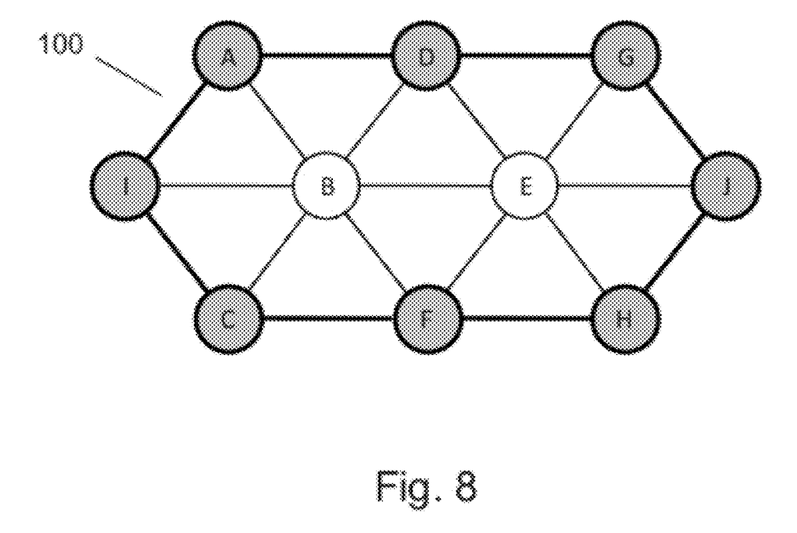
FIG. 8 schematically shows the network topology knowledge around I and J of FIG. 7, as obtained after a pruning operation performed according to an embodiment of the method of the invention.
Figure 9:
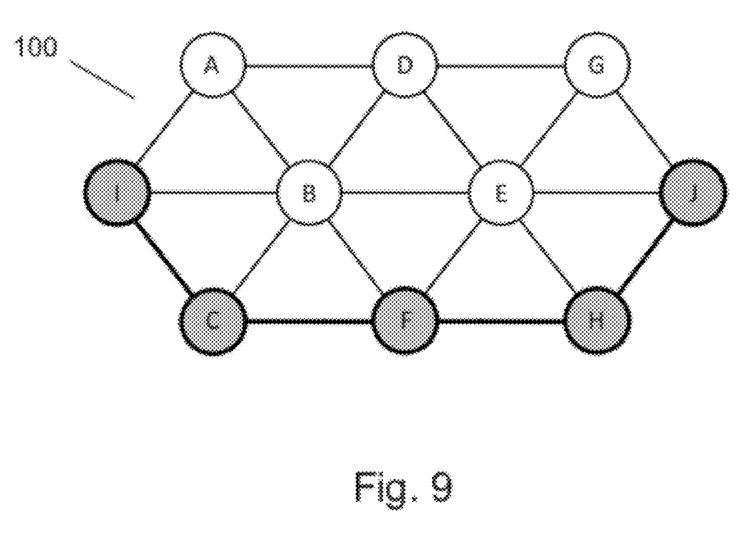
FIG. 9 schematically shows a detour path I, C, F, H, J obtained from the graph of FIG. 8.

Specifically, when node I receives the response data packet DDM, it preferably carries out the following steps:
1. joins the K-hops neighbourhood knowledge $T_k(J)$ of node J and the K-hops neighbourhood knowledge $T_k(I)$ of node I so as to get a network topology knowledge around I and J (as schematically shown in FIG. 7);
2. prunes the resulting network graph by removing any intermediate node belonging to the primary path PPx (as schematically shown in FIG. 8, wherein B and E are removed);
3. performs a detour path computation by using the pruned network graph to check if there is at least one detour path available in the pruned network graph. This step can be achieved by using any suitable algorithm for path computation known in the art as, for example, the Dijkstra Shortest Path First (SPF) algorithm described by Cormen, Thomas H.; Leiserson, Charles E.; Rivest, Ronald L.; Stein, Clifford (2009), "Section 24.3: Dijkstra's algorithm", Introduction to Algorithms (Third ed.), The MIT Press, pp. 658-664, ISBN 978-0-262-03384-8;
4. if a candidate detour path exists (e.g., I, C, F, H, J, as schematically shown in FIG. 9), node I sets it up.

For detour path set up is meant the sequence of operations required to install the identified detour path in the WMN 10, in which packet forwarding and packet re-routing are performed via label switching and label stacking. In particular, the aim of the detour path set up is that of updating the entries of the LFIB structure of each node belonging the identified detour path in order to enable fast re-routing via label stacking (e.g., in a way similar to what shown in FIG. 5 with reference to detour path C, E, F).

Figure 10:
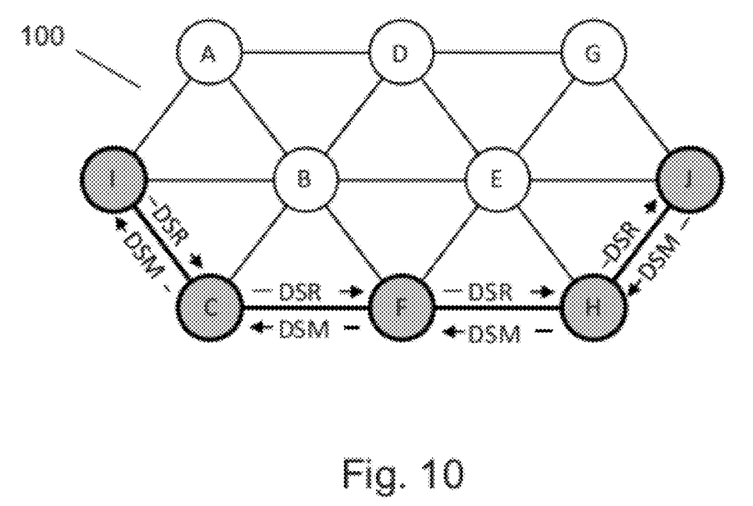
FIG. 10 schematically shows a procedure for setting up the detour path I, C, F, H, J of FIG. 9.

According to an embodiment of the invention schematically shown in FIG. 10, the identified detour path can be set up by means of a Detour Setup Request (DSR) packet and a Detour Setup Mapping (DSM) packet. The DSR packet is generated by node I and then propagated from node I towards node J along the detour path (e.g., I, C, F, H, J). The DSR packet will contain an ordered list of identifiers of the nodes of the detour path (e.g., I, C, F, H, J) so as to enable the nodes to forward the DSR packet till destination node J. The DSM packet is generated by node J and, by using the ordered list of node identifiers as received in the DSR packet, it is sent back from node J to node I along the same detour path. As in MPLS labels are assigned by the downstream node (that is, it is the downstream node that tells its upstream neighbors which outgoing label to use for a FEC when forwarding a packet), DSM packet advantageously contains information adapted to enable each node to set up the LFIB entry corresponding to the new identified detour path. The DSR and DSM packets can be any variation of a known label distribution protocol (LDP), as that one standardized in RFC 5036.

Figure 11:
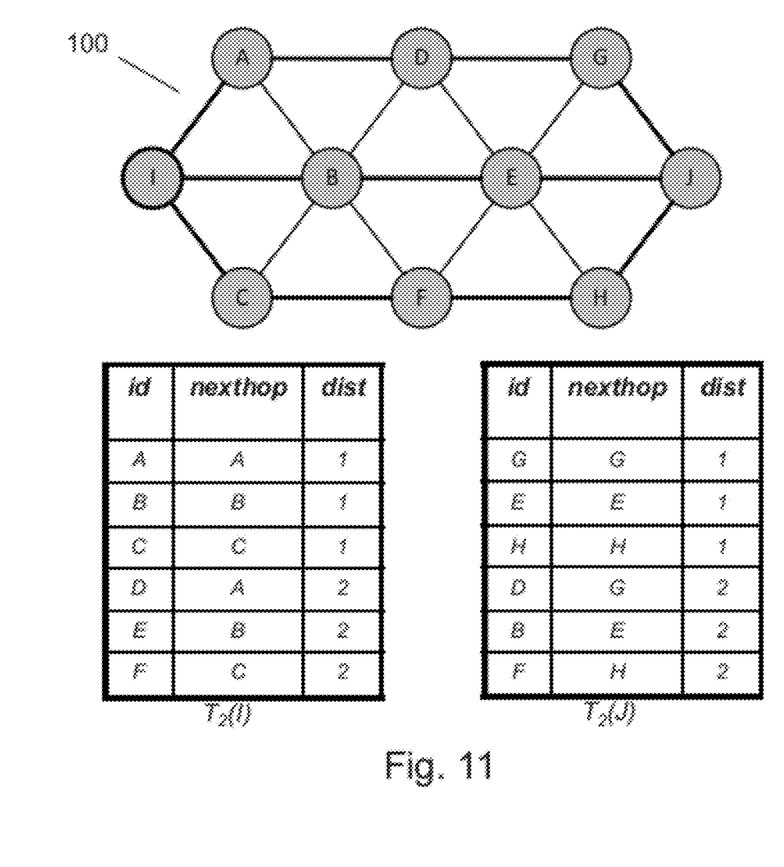
FIG. 11 schematically shows a partial network topology knowledge around I and J, as can be obtained by head node I after the propagation of the request data packet DDR and response data packet DDM of FIG. 6.

When the K-hop neighborhood knowledge $T_k(I)$ and $T_k(J)$ of node I and node J is partial, also the network topology knowledge around I and J, obtained by node I by merging $T_k(I)$ and $T_k(J)$, will be partial, as schematically shown in FIG. 11. In particular, the tables in FIG. 11 shows the raw knowledge $T_2(I)$ and $T_2(J)$ at disposal of node I and node J while the links and nodes in bold and grey color show the information that node I can deduce from such tables.

In this case, the above mentioned step c) can advantageously be carried out by means of an iterative procedure.

Due to the fact that the K-hop neighborhood knowledge is partial, in this case the identification of a detour path and its consequent set up is not guaranteed, even if it does exist.

An iterative procedure according to an embodiment of the invention is the following.

Node I computes implicitly a candidate detour path by identifying an intermediate node W through which the detour path has to pass. It then tries to set up the whole detour path by means of a detour path set up procedure. If the set up is successful, the procedure is done. Otherwise, node I iterates the above steps by identifying a new candidate intermediate node and attempting to set up the corresponding detour path, until either no further candidate intermediate node is available, or the detour path is set up.

In particular, the iterative procedure can be implemented by means of an algorithm that searches for a common neighbor between head node I and end node J as a candidate intermediate node W through which the detour path will eventually pass. For example, the search can be performed so that the overall path length between I and J through the common neighbor is minimized. Moreover, a pruning operation is advantageously performed in order to ensure that the common neighbor is not belonging to the primary path PPx. If a candidate node is found, the detour path set up procedure is run in order to attempt to set up the whole detour path.

The detour path set up procedure proceeds iteratively, by means of a Detour Setup Request (DSR') packet, a Detour Setup Failure (DSF) packet, and a Detour Setup Mapping (DSM') packet, until it finds a detour path. Essentially, a DSR' packet is generated by node I and propagated from node I towards intermediate node W and then, if the latter is reached, from node W to node J. Propagation is constrained by not traversing any node belonging to the primary path PPx, which must then be contained in the DSR' packet. The DSR' packet will also contain an ordered list of identifiers of the nodes traversed so far, while searching for a detour path. If the DSR' packet reaches a node Y between I and W (or a node Y between W and J), whose next hop towards W (or J) belongs to the primary path PPx, a DSF packet is returned by node Y to node I, which starts a new iteration.

Otherwise, if node J is finally reached by the DSR' packet, a DSM' packet is sent back to node I to install the detour path. The DSM' packet is generated by node J and, by using the ordered list of node identifiers as received in the DSR' packet, it is sent back from node J to node I along the found detour path. Considering that, as stated above, in MPLS labels are assigned by the downstream node, DSM' packet advantageously contains information adapted to enable each node to set up the LFIB entry corresponding to the new identified detour path.

In the light of the above description it will be evident that the method of the invention allows to achieve the following advantages.

In the WMN 10 according to the invention, label switching/stacking is assumed in the data plane while no specific assumption is made for the routing protocol used in the control plane. The present invention is therefore independent of any underlying routing protocol. This implies the following advantages: i) the ability to target fast reaction times in a scale that cannot be achieved, without compromising network stability, when routing protocols are used, and ii) the versatility of the solution, as it can be adopted in a wide range of WMN architectural deployments where it is not be possible or advisable to modify the existing routing protocol.

As mentioned above, in the WMN 10 according to the invention, information about a full and updated knowledge of the network topology is not required. The only requirement is a k-hop neighborhood knowledge at each node. As mentioned above, this knowledge is typically available from the underlying MAC protocol. Therefore, the fulfillment of this requirement does not imply any additional overhead and/or any additional signaling and information spreading between the nodes of the network.

In addition, the procedure of detour path identification according to the invention, based on the use of said request data packet DDR (DDR') and response data packet DDM, enables head node I to extend its knowledge of the network topology and to perform the detour path computation in an effective way by requiring a minimum exchange of packets (the two packets DDR or DDR' and DDM) and a minimum exchange of information (e.g. list of node identifiers, k-hop neighborhood knowledge of node J and possibly hop counter and output label) between nodes.

The present invention thus allows to automatically discover and set up detour paths by means of very little resources in terms of processing complexity, signaling and information spreading. For this reason it is particularly advantageous when used in a wireless mesh network wherein the available bandwidth and the node resources and capabilities are much more limited than in wired networks.

However, the method of the invention can also be used in a wired mesh network.

It is also noted that the expression wireless mesh network can be used to encompass hybrid type networks, comprising both wireless and wired links.

The preceding description and drawings merely explain the invention and the invention is not limited thereto, as those of ordinary skill in the art who have the present disclosure before them will be able to make changes and variations thereto without departing from the scope of the present invention.

What is claimed is:

1. A method of detour path determination for data packet re-routing in a mesh network, wherein, in order to obtain at least one detour path for at least part of a primary path PPx comprising a predefined ordered sequence of nodes with a head node I and an end node J, the method comprises:
   a) generating, in the mesh network comprising a plurality of N nodes, with N being an integer higher than 1, arranged according to a network topology with each node having a K-hops neighborhood knowledge of the network topology, with $1 \leq K < N$, primary paths are predefined for routing data packets within the mesh network, each primary path comprising the predefined ordered sequence of nodes, at the head node I and sending to the node following the head node I in the predefined ordered sequence of nodes a request data packet, the request data packet comprising information enabling the request data packet to travel through the predefined ordered sequence of nodes according to a forward direction till the end node J is reached;
   b) generating at the end node J upon receipt of the request data packet and sending to the node preceding the end node J in the predefined ordered sequence of nodes a response data packet, the response data packet comprising information representative of the K-hops neighborhood knowledge of the network topology of node J, and information enabling the response data packet to travel back through the predefined ordered sequence of nodes till the head node I is reached according to a backward direction; and
   c) processing at the head node I upon receipt of the response data packet the information representative of the K-hops neighborhood knowledge of node J so as to obtain a merged knowledge of the network topology comprising the K-hops neighborhood knowledge of node I and the K-hops neighborhood knowledge of node J; the head node I then using merged knowledge of the network topology to carry out a detour path computation to determine if there is the at least one detour path for the at least part of the primary path PPx.

2. The method according to claim 1, wherein the information enabling the request data packet to travel through the ordered sequence of nodes till the end node J comprises label information, the head node I setting the label information to a preconfigured value that enables the node following it to identify the primary path PPx through which the request data packet has to travel.

3. The method according to claim 1, wherein the request data packet sent in step a) by the head node I comprises an ordered list of node identifiers comprising a node I identifier.

4. The method according to claim 1, wherein the request data packet sent in step a) by the head node I comprises an ordered list of node identifiers comprising identifiers of all nodes of the ordered sequence of nodes.

5. The method according to claim 3, wherein the response data packet further comprises an ordered list of node identifiers corresponding to the ordered list of node identifiers as found in the request data packet received by the node J.

6. The method according to claim 1, wherein the information enabling the request data packet to travel through the ordered sequence of nodes according to a forward direction till the end node J is reached comprises a counter parameter HC representative of the length L in hops of the at least part of the primary path PPx.

7. The method according to claim 6, wherein upon receiving the request data packet, each next node in the ordered sequence of nodes downstream of the node I in the forward direction decreases by 1 the value of the counter parameter HC in the received request data packet, and, at each such next node:
   sending the request data packet to the node following it in the ordered sequence of nodes according to the forward direction the value of the counter parameter HC in the request data packet being updated to the decreased value if the decreased value of the counter parameter HC is greater than 1; and
   recognizing itself to be the end node J and generating and sending the response data packet if the decreased value of the counter parameter HC is equal to zero.

8. The method according to claim 7, wherein the information enabling the request data packet to travel through the ordered sequence of nodes till the end node J comprises label information, the head node I setting the label information to a preconfigured value that enables the node following it to identify the primary path PPx through which the request data packet has to travel, and wherein the request data packet sent by the each next node comprises the label information updated to a preconfigured value that enables the node following it in the ordered sequence of nodes to identify the primary path PPx through which the request data packet has to travel.

9. The method according to claim 7, wherein the request data packet sent in step a) by the head node I comprises an ordered list of node identifiers comprising a node I identifier, and wherein the request data packet sent by the each next node comprises the ordered list of node identifiers, updated with the identifier of the each next node.

10. The method according to claim 4, wherein in step b) the node J identifies the node preceding it by looking up in the ordered list of node identifiers as found in the request data packet received by the node J.

11. The method according to claim 5, wherein each previous node upstream of the node J in the ordered sequence of nodes that receives the response data packet forwards the response data packet to the node preceding it in the ordered sequence of nodes and identifies the node preceding it by looking up in the ordered list of node identifiers comprised in the received response data packet.

12. The method according to claim 1, wherein in step c) the head node I computes the detour path by excluding in the computation all the nodes comprised in the ordered list of node identifiers, other than the head node I and the end node J.

13. The according to claim 1, wherein in the mesh network data packets are forwarded using label switching and routed on detour paths using label stacking.

14. The according to claim 1, wherein the mesh network is at least in part wireless.

15. A mesh network comprising a plurality of N nodes comprising modules adapted to perform the steps of:

a) generating, in the mesh network comprising a plurality of N nodes, with N being an integer higher than 1, arranged according to a network topology with each node having a K-hops neighborhood knowledge of the network topology, with 1<K<N, primary paths are predefined for routing data packets within the mesh network, each primary path comprising a predefined ordered sequence of nodes, at the head node I and sending to the node following the head node I in the predefined ordered sequence of nodes a request data packet, the request data packet comprising information enabling the request data packet to travel through the predefined ordered sequence of nodes according to a forward direction till the end node J is reached;

b) generating at the end node J upon receipt of the request data packet and sending to the node preceding the end node J in the predefined ordered sequence of nodes a response data packet, the response data packet comprising information representative of the K-hops neighborhood knowledge of the network topology of node J, and information enabling the response data packet to travel back through the predefined ordered sequence of nodes till the head node I is reached according to a backward direction; and c) processing at the head node I upon receipt of the response data packet the information representative of the K-hops neighborhood knowledge of node J so as to obtain a merged knowledge of the network topology comprising the K-hops neighborhood knowledge of node I and the K-hops neighborhood knowledge of node J; the head node I then using the merged knowledge of the network topology to carry out a detour path computation to determine if there is the at least one detour path for the at least part of the primary path PPx.

* * * * *